United States Patent [19]

Kavli et al.

[11] Patent Number: 4,735,098
[45] Date of Patent: Apr. 5, 1988

[54] DUAL DIAPHRAGM DIFFERENTIAL PRESSURE TRANSDUCER

[75] Inventors: Fred Kavli, Malibu; Kyong Park, Chatsworth, both of Calif.

[73] Assignee: Kavlico Corporation, Moorpark, Calif.

[21] Appl. No.: 838,514

[22] Filed: Mar. 11, 1986

Related U.S. Application Data

[63] Continuation-in-part of Ser. No. 799,447, Nov. 19, 1985, Pat. No. 4,680,971.

[51] Int. Cl.$^4$ .......................... G01L 7/08; G01L 9/12; G01L 9/04
[52] U.S. Cl. .................................. 73/718; 73/708; 361/283
[58] Field of Search .................. 73/718, 724, 708, 720, 73/721; 361/283

[56] References Cited

U.S. PATENT DOCUMENTS

| | | | |
|---|---|---|---|
| 4,072,057 | 2/1978 | Yasuhara et al. | 73/718 |
| 4,169,389 | 10/1979 | Yasuhara et al. | 73/718 |
| 4,301,492 | 11/1981 | Paquin et al. | 73/718 |
| 4,586,018 | 4/1986 | Bettman | 73/720 |

Primary Examiner—Donald O. Woodiel
Attorney, Agent, or Firm—Poms, Smith, Lande & Rose

[57] ABSTRACT

A corrosion proof differential pressure transducer includes a central disk and two thin diaphragms mounted close to but spaced from the disk on both sides thereof, with the diaphragms being intercoupled to move together. This may be accomplished, for example, by a rod passing through a hole in the center of the central disk which is secured to each of the diaphragms; or by a fluid such as silicone oil in the space between the diaphragms and flowing through one or more holes through the central disk. At least one of the diaphragms, the central disk and the rod (when one is used) are formed of alumina, quartz, or other inert, insulating material having substantially zero mechanical hysteresis. One of the diaphragms may be a thin, tough, flexible insulating membrane. Conductive plates providing variable capacitance with changes in pressure may be mounted on the inner surface one or both of the diaphragms and on the facing surface of the central disk. Alternatively, resistive elements bonded to the inner surfaces of the diaphragms may be employed as the pressure sensing elements, as their resistance changes with flexing of the diaphragms. A housing and associated gaskets direct pressures from two different fluids to the two diaphragms, so that the differential pressure is measured.

19 Claims, 4 Drawing Sheets

DUAL DIAPHRAGM DIFFERENTIAL PRESSURE TRANSDUCER

This is a continuation-in-part of our prior copending patent application Ser. No. 799,447, filed Nov. 19, 1985, now U.S. Pat. No. 4,680,971.

FIELD OF THE INVENTION

This invention relates to differential pressure transducers.

BACKGROUND OF THE INVENTION

Pressure transducers employing diaphragms are well known, and they may involve the use of a diaphragm which is either formed of conductive material or has a layer of conductive material on it, and as the diaphragm is shifted in position with changes in pressure, the capacitance between the conductive layer and an adjacent capacitive plate is varied. One widely used capacitive transducer is shown in U.S. Pat. No. 4,388,668, granted June 14, 1983, and assigned to the assignee of the present invention. It has also been proposed to mount thick film or thin film resistors on diaphragms, with the resistance of the film resistors varying as the diaphragms flex and the resistors are stressed.

Differential pressure transducers are also known, and one such transducer is shown in U.S. Pat. No. 4,425,799, granted Jan. 17, 1984 and also assigned to the assignee of the present invention. A differential pressure transducer measures the difference in pressure between two separate bodies of fluid, and in the case of the transducer disclosed in U.S. Pat. No. 4,425,799, this is accomplished by applying pressure to both sides of a diaphragm, with spaced conductive plates being secured to the diaphragm and to an adjacent fixed plate. Accordingly, as the diaphragm changes position under the opposing forces from the two sources of pressure, the capacitance between the two plates varies, and a resultant electrical signal varies to indicate the differential pressure.

The diaphragm may be made of an inert insulating material, such as alumina, which also has a low mechanical hysteresis. In the patents cited hereinabove, the use of either quartz, alumina, or glass such as Pyrex, as the diaphragm and associated fixed plate, are disclosed. Electrically conductive layers are formed on the opposing surfaces of the spaced diaphragm and thicker plate, to provide the capacitance plates of the variable capacitance. When this type of unit is employed as a differential transducer, the fluids to be measured may be applied to both sides of the diaphragm. When this is done, the fluids to be measured, which may be corrosive, would contact the conductive metal plates, and could corrode them. When the electrical plates are corroded, they may engage one another, or may change their output capacitance, both of which would make the transducer unreliable. A similar adverse result could occur from the corrosion of resistors mounted on the diaphragms if they were to be used instead of capacitance sensors.

Accordingly, an important object of the present invention is to provide a simple and reliable differential pressure transducer, and one which is not adversely affected by corrosive fluids, the differential pressure of which is being measured.

SUMMARY OF THE INVENTION

In accordance with the present invention, a differential pressure transducer includes a central base plate made of inert insulating material, and having at least one hole therethrough, and two diaphragms, made of thin insulating material having low mechanical hysteresis mounted on each side of the base member and spaced apart from the base member by a distance of from about one-half a thousandth of an inch to about ten thousandths of an inch, and having at least the central portions of the two diaphragms coupled together. This coupling may be accomplished by a rod extending through the central opening in the base plate and secured to the centers of the two diaphragms, or alternatively by the use of a fluid, such as silicone oil between the diaphragms, and flowing through one or more holes in the central disk as the diaphragms flex. If desired, at least one of the diaphragms may be formed of a very thin flexible membrane, such as KAPTON. Variable capacitance or variable resistance elements may be mounted on the inner surfaces of the diaphragms, and in the case of the capacitive elements, on the facing surface of the base plate. A housing, and sealing or gasket arrangements are provided for applying pressure from two separate bodies or channels of fluid having different pressures, to the outer surfaces of the respective diaphragms, thereby contacting only the inert outer surfaces of the diaphragms and not contacting the metallic sensor elements.

The embodiments of the invention may also include the following additional features:

1. The central base plate, the two diaphragms, and the interconnecting rod (when used) preferably have the same thermal coefficient of expansion, so that changes in temperature do not adversely affect the accuracy of the unit.

2. The base plate, one or both of the diaphragms, and the interconnecting rod (when used) may be formed of alumina, of quartz, of glass such a Pyrex glass, or other insulating material having substantially zero mechanical hysteresis.

3. The base plate, and the two diaphragms are preferably circular, one or both of the diaphragms may have flat opposed surfaces, and are between one and two inches in diameter.

4. At least one of the diaphragms is preferably between about 0.010 inch and about 0.25 inch in thickness, depending on the desired pressure range of the transducer.

5. The diaphragms are preferably sealed to the base plate around the peripheries of the diaphragms. One or both of the diaphragms may be secured to the base plate by glass frit, made up of two different types of glass, which serves not only to space the diaphragm apart from the base plate, by a predetermined distance determined by the particle size of the glass frit, and to seal the two elements together. Alternatively, one or both of the diaphragms may be secured to the base plate by other adhesives.

6. A plastic housing may be provided, with input ports or conduits axially aligned with the transducer, and with one input port and conduit facing one of the diaphragms and the other input port facing the other diaphragm. A peripheral metal band with inturned edges may hold rubber rings around the periphery of the two diaphragms to seal them to the enclosing housing, thereby directing the input fluid pressure from one port to the adjacent diaphragm, and similarly directing input pressure from the other input port or conduit to the other diaphragm.

In accordance with one aspect of the invention, instead of using capacitive plates to sense changes in pressure as the diaphragms flex, thin or thick resistance films, or strain gauge type components, may be bonded to the inside surfaces of the diaphragms to sense the pressure changes as the diaphragms flex.

In accordance with a further alternative, one of the diaphragms may be in the form of a thin, tough, insulating membrane peripherally secured to the central base plate, and with sensing elements, either capacitive plates or preferably resistive sensors secured to the inner surfaces of one or both of the diaphragms. By way of example, but not of limitation, the membrane may be formed of a Dupont product sold under the trademark KAPTON, which may be used for the present purposes with a sheet thickness of about 0.001 inch.

Concerning the resistive sensors, they may be in the form of thin nichrome alloy elements which may be secured to the diaphragms or membranes by adhesives. Alternatively, the resistors may be vapor deposited onto the diaphragms of either the thicker or the membrane type. When applied to the alumina, quartz, pyrex or ceramic diaphragms, the resistive elements may be silk screened onto selected areas of the surface in the form of a paste including tungsten, manganese and/or nichrome metals, and subsequently fired at high temperature to bond the thick or thin film resistors to the diaphragms. This last technique is not applicable to the very thin insulating plastic membrane, as they cannot withstand the very high firing temperatures.

When alumina, KAPTON, or other inert materials are employed as the diaphragm material, and the variable capacitance plates or resistance sensing elements are inside the diaphragms, these conductive plates are not exposed to the possibly corrosive effects of the fluid being measured, and the resultant differential pressure transducer is therefore corrosion-proof. This is particularly useful when the differential pressure transducer is employed in automotive applications.

Other objects, features, and advantages will become apparent from a consideration of the following detailed description and from the accompanying drawings.

DETAILED DESCRIPTION

Figures 1, 2, 3, 4:
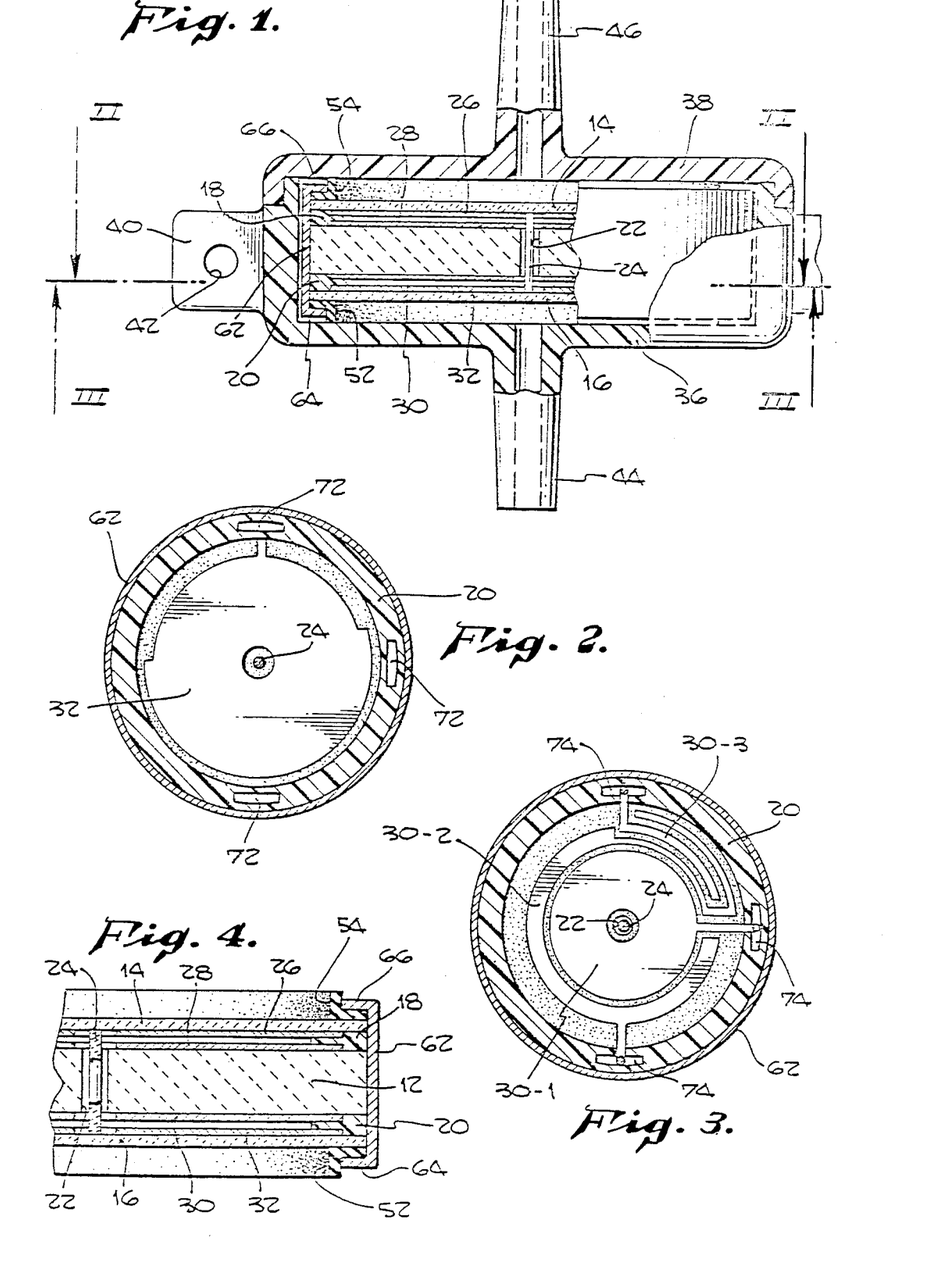
FIG. 1 is a partial cross-sectional view through a transducer illustrating the principles of the present invention.
FIGS. 2 and 3 are cross-sectional views taken as indicated at II—II and III—III, respectively, of FIG. 1 showing representative metal electrode configurations.
FIG. 4 is an enlarged cross-sectional view of a portion of FIG. 1.

Referring more particularly to the drawings, FIG. 1 shows a differential transducer assembly including a central relatively thick plate 12 of quartz, alumina, glass such as Pyrex, or other insulating material having substantially zero mechanical hysteresis. Other ceramic materials may also be employed. Mounted on either side of the plate 12 and spaced from it are two diaphragms 14 and 16 which may be made of the same material as the base plate 12. The diaphragms 14 and 16 may be mounted to the base plate 12 by the peripheral rings of glass frit 18 and 20 which are made of finely divided particles of at least two different types of glass, having different melting points so that the spacing between the diaphragms 14 and 16, and the base plate 12 may be determined by the particle size of the glass frit having the higher melting point. Instead of glass frit, other adhesive material may be employed to bond and seal the diaphragms to the base plate 12.

The base plate 12 has a central opening 22, through which extends a rod 24 which is secured to and mechanically interconnects the two diaphragms 14 and 16. The rod 24 may be secured to diaphragms 12 and 14 by adhesives or by fired glass frit. Alternatively, the rod 24 could extend through and be sealed to the diaphragms. The rod 24 may be made of the same material as the diaphragms and the base plate 12, or of a material having the same thermal coefficient of expansion, so that the entire assembly expands and contracts with changes in temperature without any significant loss of accuracy of the sensor.

On the facing surfaces of the central plate 12 and at least one of the diaphragms such as diaphragm 14, are the thin layers of conductive material 26 and 28. These may be applied by screening a paste including the conductive metal in a silk screen process, and then firing the elements, before they are joined together with the glass frit 18. The facing surfaces of the diaphragm 16 and the plate 12 may similarly be provided with conductive surfaces 30 and 32.

Enclosing the differential transducer including central plate 12 and diaphragms 14 and 16, is a plastic housing including a base member 36, and a cover section 38. The base section 36 is provided with a mounting plate 40 having an openings 42 to receive mounting screws or the like. The base portion 36 is provided with an input conduit 44 for receiving fluid pressure from one source, while the cover plate 38 is provided with an input conduit 46 for receiving pressure from another source, so that the output from the pressure transducer is an indication of the differential pressure relating to the fluid pressures applied through ports 44 and 46. In order to assure application of the pressure from port 44 to the diaphragm 16, a rubber gasket 52 is provided which has an L-shaped cross-section so that it bears both on the outer surface of outer diaphragm 16 and on the inner surface of the housing 36. Similarly, the rubber gasket member 54 seals between the diaphragm 14 and the cover portion 38 of the plastic case, to assure that pressure from input conduit 46 is applied solely to the diaphragm 14. The metal housing or rim 62 having inturned edges 64 and 66 serves to hold the rubber gasket members 52 and 54 in place in the assembly.

In operation, when fluid pressure from conduit 44 is applied to diaphragm 16, and fluid pressure from conduit 46 is applied to diaphragm 14 the two diaphragms will move together either toward conduit 44 or toward conduit 46 depending on the differential pressure. Of course, with the rod 24 positively interconnecting these two diaphragms, they are constrained to move together. Further, it may be noted that even if one or both of the fluids supplied through conduits 44 and 46 are corrosive, they are only in contact with inert portions such as the inside of the plastic housing 36, 38, and the outer surface of the alumina diaphragms 14 and 16, so that the conductive electrodes may not be corroded and adversely affected.

Turning now to other figures of the drawings, FIGS. 2 and 3 are views of the electrode configuration taken upward and downwardly from the dashed dot lines designated II—II and III—III of FIG. 1. The electrode configuration of FIGS. 2 and 3 may vary considerably from one type of pressure transducer to another. Essentially it involves the electrodes 30 and 32, with the capacitance between these two electrodes increasing, as the diaphragm 16 comes closer to the base plate 12 and similarly, the capacitance is reduced in value as the diaphragm 16 goes further away from the base plate 12. In FIGS. 2 and 3, the one conductive plate 32 is grounded, and with reference to FIG. 3, the grounded ring 30-2 encloses the active capacitive portion 30-1. The small capacitance element 30-3 serves a compensating function, as described in greater detail in U.S. Pat. No. 4,227,419, granted Oct. 14, 1980, and assigned to the assignee of the present invention.

FIG. 4 is an enlarged cross-sectional view of a portion of FIG. 1, with the same reference numerals being used in FIG. 4 as were employed in FIG. 1.

Incidentally, it is to be noted that the drawing is not exactly to scale, as the metallized conductive surfaces 26, 28 and 30, 32 would actually be very thin, less than one thousandth of an inch thick. A number of types of pastes are commercially available which may be silk screened into the configurations shown in FIGS. 2 and 3, and then fired to form a very thin conductive coating on the underlying material. In practice, it is preferred to use a gold coating. Electrical connections to the capacitor plates may be made in any convenient manner, and leads may conveniently be brought out through openings such as those indicated at reference numeral 72 in FIG. 2 and at 74 in FIG. 3. The output from the variable capacitor is then coupled to a printed circuit having a circuit such as that shown in U.S. Pat. No. 4,398,426, granted Aug. 16, 1983, and assigned to the assignee of the present invention. The printed circuit may, for example, be mounted in the base of the housing shown in the present drawings, or may be mounted separately. Concerning another minor matter, the two diaphragms 14 and 16 are preferably sealed peripherally to the central plate 12 to avoid contamination of the interior of the transducer; however, as long as the two input conduits 44 and 46 are hermetically sealed to respective periphery of the diaphragms 16 and 14, the space within the transducer need not be sealed. If desired, one of the two pairs of plates 26, 28 or 30, 32 may be eliminated. Alternatively, the increase in capacitance of one set of plates and the concurrent decrease in capacitance of the other set of plates may be processed separately to indicate the differential pressure, and the results averaged.

As mentioned above, FIGS. 5, 6 and 7 relate to an alternative embodiment of the invention.

Figures 5, 8:
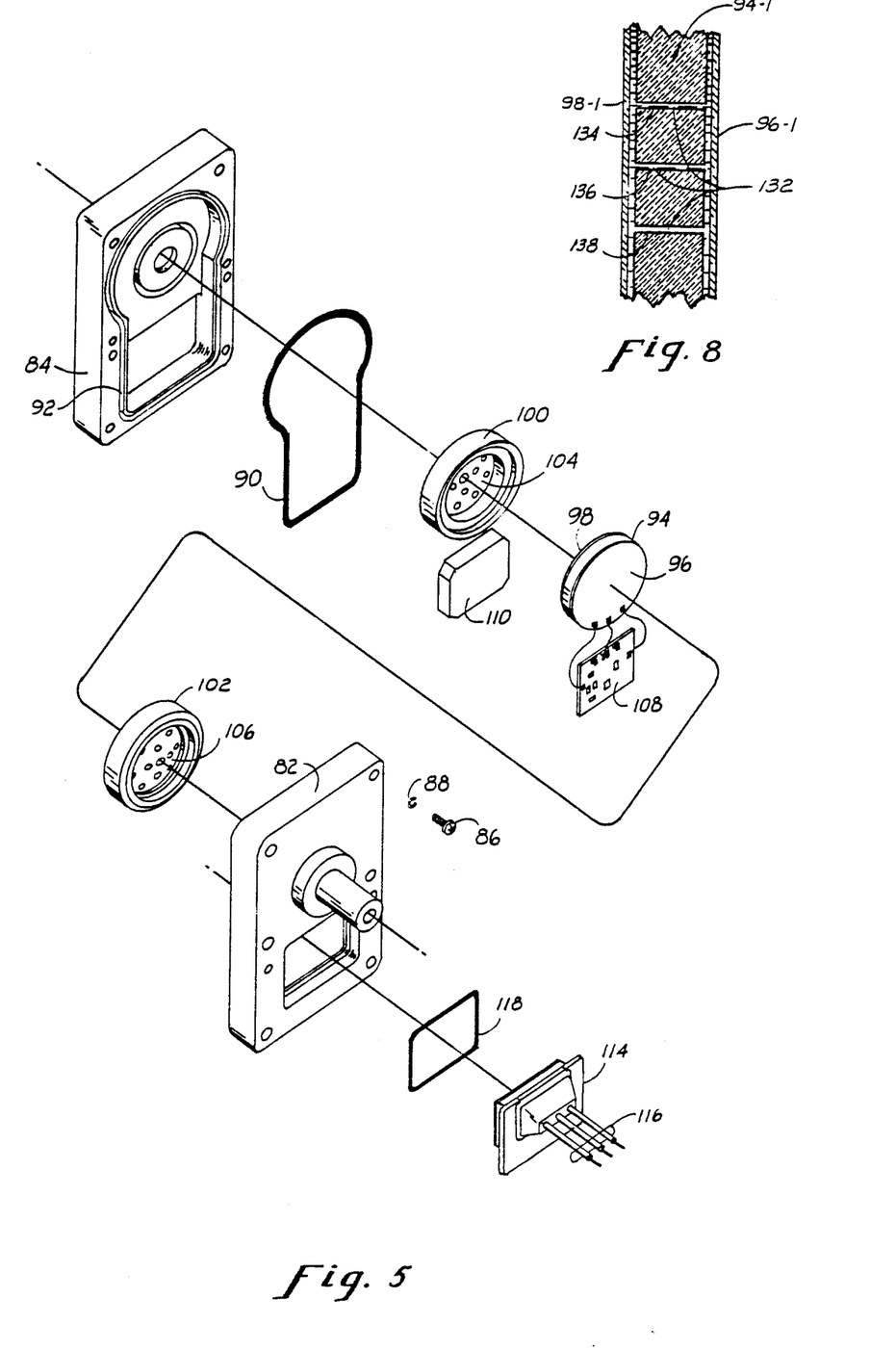
FIG. 5 is an exploded view of an alternative embodiment of the invention.
FIG. 8 is a partial cross-sectional view illustrating an alternative embodiment of the invention.

FIG. 5 is an exploded view of the differential pressure transducer and includes two housing members 82 and 84. These housing members are held together with six screws 86, which pass through openings in the housing section 82, are secured into tapped holes in the housing section 84, and are held in place by lock washers 88. The rubber gasket member 90 is mounted in a groove 92 which extends around the central opening in the housing members 84 and 82, and serves to seal the two housing parts together when they are pulled together by the screws 86.

A central transducer member 94 provided with outer diaphragms 96 and 98, is mounted between a pair of cushioning gasket members 100 and 102 which also serve to hold the two metal shielding members 104 and 106 in their proper positions on either side of the transducer 94. A small printed circuit board 108 provides the electronic circuitry for processing the variable capacitance signals from the transducer 94 and providing a voltage output signal which is proportional to the changes in pressure. The printed circuit board 108 serves to implement the circuitry described in the U.S. patents assigned to the assignee of this patent application, which were cited hereinabove. The printed circuit board 108 is mounted on the insulated plate 110, which may be either ceramic or molded plastic. Incidentally, as an alternative configuration, the central member of the transducer 94 may be extended in a shape substantially similar to the outline of the opening in the housing 84 and similar to the configuration of the gasket but somewhat smaller, and the printed circuit board 108 may be mounted on this extended ceramic base member. As a further alternative, the alumina plate of the central member of the transducer 94 may form the substrate for the printed circuit elements which are shown in FIGS. 5 and 7 on the separate printed circuit board 108.

The output signals from the printed circuit board 108 are coupled by the connector 114 to the three output leads 116. The rubber gasket 118 serves to seal the connector assembly 114 into the housing member 82. The connector 114 may be secured to the housing 82 by staking, by gluing, by ultrasonic welding, or by any other suitable technique.

Figure 7:
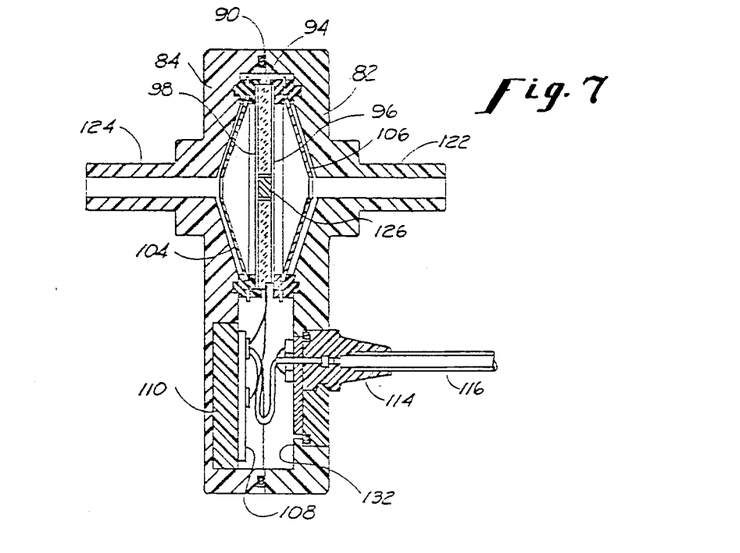
FIG. 7 is a cross-sectional view taken along lines VII—VII of FIG. 6.

As best shown in FIG. 7, the housing members 82 and 84 have outwardly extending coupling tubes 122 and 124 respectively, to which the fluid pressures to be measured are applied. The pressure from the input 122 is applied to diaphragm 96, while the pressure applied through input port 124 is applied to the diagraphm 98. With the two diaphragms being physically interconnected by the linkage 126, the deflection of the diaphragms is proportional to the difference in pressure between the two fluids which are being measured. Incidentially, the linkage element 126 is preferably made of the same material as the diaphragms 96 and 98, and the central base member 94 of the transducer, or it may be made of a different material having substantially the same thermal coefficient of expansion. Further, the element 26 may be secured to the diaphragms by glass frit, in the same manner as the diaphragms are secured to the central base member.

Figure 6:
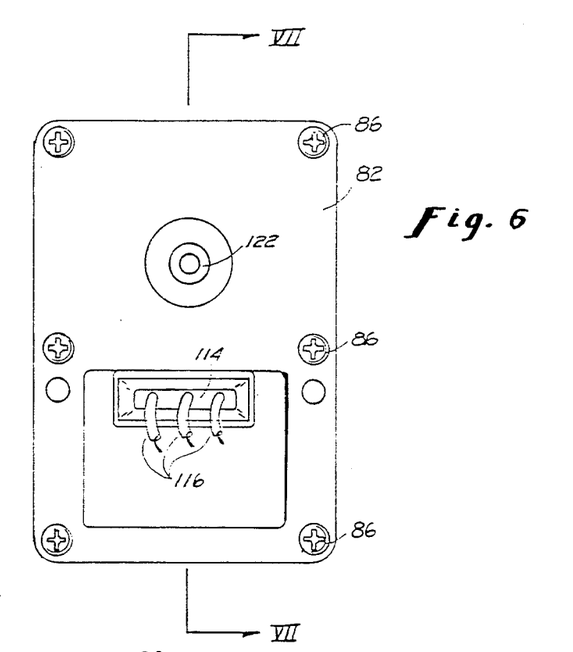
FIG. 6 is a view of the assembled transducer of FIG. 5.

In the arrangement shown in FIGS. 5 through 7 of the drawings, the two housing members 82 and 84 are plastic. As an alternative, these two outer members could be formed of metal, such as aluminum. With the housing members being formed of plastic, the inner surfaces 132 of the housing members are preferably coated with conductive material for increased electrical shielding. In addition, as mentioned above, the shielding members 104 and 106 are provided to further shield the variable capacitance plates which are provided between one of the diaphragms 96 or 98, and the central base member of the transducer 94. Of course, when aluminum housing members are employed, no supplemental conductive coating would be required on the inside surfaces of these housing members.

It is also noted in passing that the spacing of the diaphragms 96 and 98 relative to the central base member is so small that the spacing does not show in the cross-sectional view of FIG. 7. However, it is of the order of magnitude discussed above in connection with the first embodiment of the invention.

FIG. 8 is a partial cross-sectional view illustrating an alternative embodiment of the invention in which the two diaphragms 96-1 and 98-1 are intercoupled by silicone oil. The silicone oil 132 fills the spaces between the diaphragm 96-1 and the central fixed plate 96-1, and between the diaphragm 98-1 and plate 94-1, as well as the openings 134, 136, 138 extending through the central plate 94-1. In order to minimize temperature effects, the volume of silicone oil is kept to a minimum by providing a plurality of small diameter holes 134, 136, 138. In this regard, the hole 136 may be centrally located, and a series of spaced holes including holes 134 and 136 may be evenly spaced around the central hole. With the spacing between the diaphragms and the central plate normally being in the order of one to a few thousandths of an inch, and the holes being of relatively small diameter, the effects of temperature changes resulting in a small differential expansion of the fluid, will be minimal.

Figure 9:
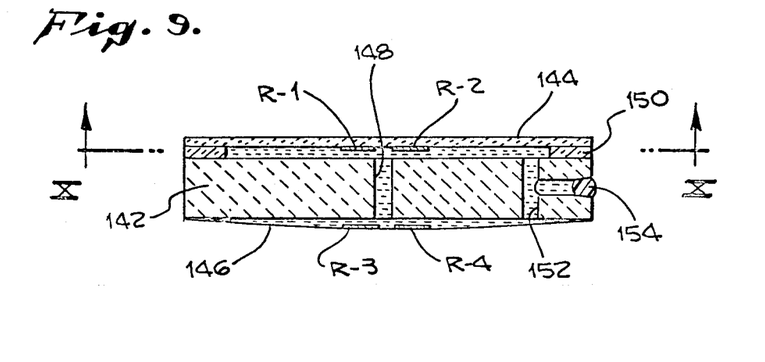
FIG. 9 is a cross-sectional view of an alternative embodiment of the invention wherein variable resistance members are employed.
Figure 10:
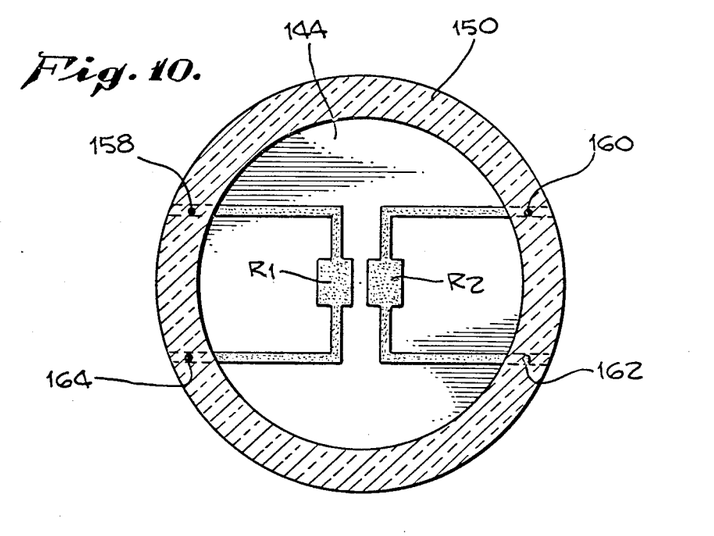
FIG. 10 is a cross-sectional view taken along lines X—X of FIG. 9.

FIGS. 9 and 10 show a further alternative embodiment of the invention wherein one of the two diaphragms 144 is mounted to the central base plate 142 by frit 150 in the manner discussed hereinabove in connection with the other figures of the drawings. However, the lower diaphragm 146 is actually a thin, tough, insulating membrane 146, which may, for example, be formed of a Dupont product known as KAPTON. The space between the diaphragm 144 and the base plate 142, as well as the central opening 148, and the space between the base plate 142 and membrane 146 are all filled with an insulating low viscosity fluid, such as silicone oil. This silicone oil may be supplied into the transducer through the T-shaped opening 152, which may be subsequently sealed with a small dab 154 of epoxy paste or the like.

As mentioned above, instead of the use of capacitive plates as the sensing elements, resistive films may be secured to the inner surfaces of the diaphragms 144 and 146 as indicated by the resistors R1 and R2 secured to the inner surface of the alumina diaphragm 144, and resistors R3 and R4 secured to the inner surface of the membrane 146. Incidentally, the nature of the resistors has been discussed in some detail in the introduction of the present specification and will not be repeated here.

FIG. 10 is a partial cross-sectional view taken along dashed lines X—X of FIG. 9. FIG. 10 shows the resistors R1 and R2, and their electrical connections to points 158, 160, 162 and 164, from which points the electrical connections are coupled to leads extending away from the pressure transducer.

Figure 11:
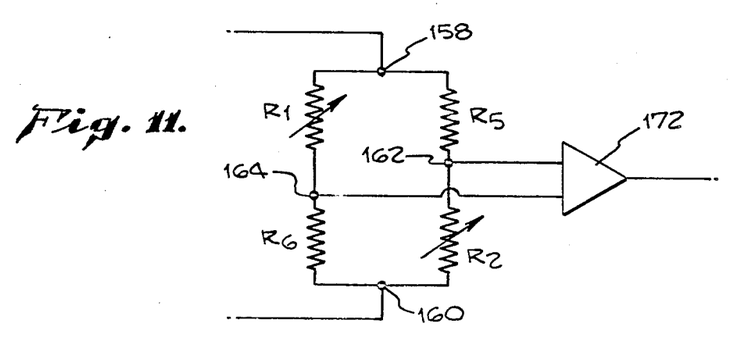
FIG. 11 shows an electrical circuit which may be employed in connection with the embodiment of FIGS. 9 and 10.

FIG. 11 shows a Wheatstone bridge arrangement in which two of the resistors R1 and R2 are connected in circuit with two fixed resistors R5 and R6. More specifically, the resistors R5 and R6 are fixed in value and do not change their resistance as the diaphragms flex. In order to have their temperature variations track those of R1 and R2, it is desirable that the resistors be made of similar material and located in proximity to the resistors R1 and R2, and have the same resistance. In some cases, the resistors R5 and R6 may be mounted on the transducer and made of the same materials, but deposited in a location which does not flex.

In practice, whenever the resistors R1 or R2 are strained as the diaphragm flexes from its neutral position, their resistance changes, and these changes will unbalance the Wheatstone bridge as shown in FIG. 11. Thus, with a constant voltage being applied across between points 158 and 160, with the diaphragm unflexed, and all the resistors being equal, the same voltage will be present at points 162 and 164, and no differential voltage will be applied to the amplifier 172. However, when a significant differential pressure is applied across the oil-filled transducer of FIGS. 9 and 10, the diaphragm 144 will flex, and the resistance of the two resistors R1 and R2 will change significantly, thus unbalancing the Wheatstone bridge, and providing a substantial differential voltage between points 162 and 164. This will provide a substantial output from the differential amplifier 172 indicative of the differential pressure.

Incidentally, instead of using the resistors R1 and R2 in the Wheatstone bridge of FIG. 11, the resistors R3 and R4 could be employed. Alternatively, one of the two resistors such as R1 secured to the diaphragm 144 and another resistor such as R3 secured to the membrane 146 may be employed in the circuit of FIG. 11.

In conclusion, it is to be understood that the foregoing detailed description and the accompanying drawings merely relate to one illustrative embodiment of the invention. Variations from the specific design shown hereinabove are possible within the scope of the present invention. Thus, by way of example and not of limitation, the capacitive electrode configuration may be different from that shown in FIGS. 2 and 3, and could be those, for example, shown in other patents cited hereinabove. Similarly, the configuration of the resistors R1 through R4 on the diaphragms may be rectangular, or could be pre-formed strain gauge resistances. Also, concerning the housing and the rubber sealing rings, other arrangements could be employed to accomplish the same functions; for example, O-rings may be employed instead of the rubber gasket rings having an L-shaped configuration. In addition, the diaphragms, the central base plate, and the connecting rod may be formed of any suitable insulating material having substantially zero mechanical hysteresis. Various materials which may be employed include alumina, which is preferred, quartz, Pyrex glass, and other ceramics falling within the category mentioned hereinabove. Also, in the embodiment of FIG. 9, capacitive plates may be mounted on the facing surfaces of diaphragm 144 and base plate 142 instead of the variable resistance sensors. Accordingly, the present invention is not limited to the construction precisely as described in detail hereinabove and as shown in the drawings.

What is claimed is:

1. A corrosion-proof pressure transducer for measuring the pressure difference between two fluids, comprising:
   a central insulating base member having at least one opening and two spaced flat sides;
   first and second thin substantially flat inslating diaphragms having substantially zero mechanical hysteresis;

means for mounting said diaphragms, one on each side of said base member and spaced apart from said base member at the center of said diagrams by between 0.0005 and 0.010 inch, and peripherally secured to said base member;

means for intercoupling said pair of diaphragms extending through the opening in said base member;

means responsive to the flexing of at least one of said diagrams for producing an electrical output signal substantially proportional to the differential pressure;

enclosing means having first and second input ports for applying fluid pressures from two different sources to the outer surfaces of said first and second diaphragms, respectively; and resilient means mounted near the peripheries of said first and second diaphragms directing and limiting the fluid path from each of input ports to the associated diaphragm;

whereby the electrical output signal is a function of the difference in the fluid pressures applied to said two diaphragms.

2. A corrosion-proof pressure transducer as defined in claim 1 wherein one of said diaphragms is formed of a ceramic material, the other of said diaphragms is a very thin, tough, membrane, and wherein the intercoupling means is an insulating fluid filling said hole and the space between said diaphragms and said central base member.

3. A corrosion-proof pressure transducer as defined in claim 1 wherein said means for producing an electric signal is mounted between the inner surfaces of said two diaphragms.

4. A corrosion-proof pressure transducer as defined in claim 1 wherein said means for producing an electric signal includes resistive material bonded to the inner surface of at least one of said diaphragms having a resistance which varies with deflection of said diaphragm.

5. A corrosion-proof pressure transducer as defined in claim 1 wherein said means for producing an electric signal includes a pair of facing capacitive plates, one mounted on the inner surface of one of said diaphragms and the other mounted on said central insulating base member.

6. A corrosion-proof pressure transducer as defined in claim 1 wherein said central insulating base member and at least one of said diaphragms are made of alumina.

7. A corrosion-proof pressure transducer as defined in claim 1 wherein said diaphragm intercoupling means is an insulating fluid filling the space between said diaphragms.

8. A corrosion-proof pressure transducer for measuring the pressure difference between two fluids, comprising:

a central insulating base member having at least one opening and two spaced flat sides;

first and second thin substantially flat insulating diaphragms having substantially zero mechanical hysteresis, one of said diaphragms being a very thin flexible membrane;

means for intercoupling said pair of diaphragms extending through the opening in said base member;

means responsive to the flexing of at least one of said diaphragms for producing an electrical output signal substantially proportional to the differential pressure, said means being located between the inner surfaces of said two diaphragms where it is not exposed to the fluids being measured;

enclosing means having first and second input ports for applying fluid pressures from two different sources to the outer surfaces of said first and second diaphragms, respectively; and resilient means mounted near the peripheries of said first and second diaphragms directing and limiting the fluid path from each of input ports to the associated diaphragm;

whereby the electrical output signal is a function of the difference in the fluid pressures applied to said two diaphragms.

9. A corrosion-proof pressure transducer as defined in claim 8 wherein one of said diaphragms is formed of a ceramic material, the other of said diaphragms is a very thin, tough, membrane, and wherein the intercoupling means is an insulating fluid filling said hole and the space between said diaphragms and said central base member.

10. A corrosion-proof pressure transducer as defined in claim 8 wherein said means for producing an electric signal is mounted between the inner surfaces of said two diaphragms.

11. A corrosion-proof pressure transducer as defined in claim 8 wherein said means for producing an electric signal includes resistive material bonded to the inner surface of at least one of said diaphragms and having variable resistance with deflection of said diaphragm.

12. A corrosion-proof pressure transducer as defined in claim 8 wherein said means for producing an electric signal includes a pair of facing capacitive plates, one mounted on the inner surface of one of said diaphragms and the other mounted on said central insulating base member.

13. A corrosion-proof pressure transducer as defined in claim 8 wherein said central insulating base member and at least one of said diaphragms are made of alumina.

14. A corrosion-proof pressure transducer as defined in claim 8 wherein said diaphragm intercoupling means is an insulating fluid filling the space between said diaphragms.

15. A corrosion-proof pressure transducer for measuring the pressure difference between two fluids, comprising:

a central insulating base member having at least one opening and two spaced flat sides;

first and second thin substantially flat insulating diaphragms having substantially zero mechanical hysteresis, one of said diaphragms being formed of a thin stiff material, and the other of said diaphragms being formed of a flexible membrane;

means for mounting said stiff diaphragm on one side of said base member and spaced apart from said base member by between 0.0005 and 0.010 inch, and peripherally secured to said base member;

means for mounting said membrane on the other side;

means for intecoupling said pair of diaphragms extending through the opening in said base member, said intercoupling means comprising an insulating fluid;

means responsive to the flexing of at least one of said diaphragms for producing an electrical output signal substantially proportional to the differential pressure;

enclosing housing means having first and second input ports extending directly through said housing directly to the outer surfaces of said first and second diaphragms, respectively; and resilient gasket means mounted near the peripheries of said first and second diaphragms directing and limiting the fluid path from each of input ports to the associated diaphragm;

whereby the electrical output signal is a function of the difference in the fluid pressures applied to said two diaphragms.

16. A corrosion-proof pressure transducer as defined in claim 15 wherein said means for producing an electric signal is mounted between the inner surfaces of said two diaphragms.

17. A corrosion-proof pressure transducer as defined in claim 15 wherein said means for producing an electric signal includes resistive material bonded to the inner surface of at least one of said diaphragms and having variable resistance with deflection of said diaphragm.

18. A corrosion-proof pressure transducer as defined in claim 15 wherein said means for producing an electric signal includes a pair of facing capacitive plates, one mounted on the inner surface of one of said diaphragms and the other mounted on said central insulating base member.

19. A corrosion-proof pressure transducer as defined in claim 15 wherein said central insulating base member and at least one of said diaphragms are made of alumina.

* * * * *